United States Patent [19]

Schmidt et al.

[11] Patent Number: 5,643,797
[45] Date of Patent: Jul. 1, 1997

[54] PROCESS OF CONTINUOUSLY CONTROLLING THE PH OF AN ACID LIQUID INCLUDING MEASURING THE PH CONTINUOUSLY WITH A GLASS ELECTRODE

[76] Inventors: Hans J. Schmidt, Im Trutz 38, D-60322 Frankfurt am Main; Bertold Stegemann, Am Tiergarten 22, D-60316 Frankfurt am Main, both of Germany

[21] Appl. No.: 495,433

[22] PCT Filed: Dec. 23, 1993

[86] PCT No.: PCT/EP93/03675

§ 371 Date: Jul. 5, 1995

§ 102(e) Date: Jul. 5, 1995

[87] PCT Pub. No.: WO94/16369

PCT Pub. Date: Jul. 21, 1994

[30] Foreign Application Priority Data

Jan. 9, 1993 [DE] Germany ............ 43 00 388.5

[51] Int. Cl.$^6$ ................................. G01N 35/08
[52] U.S. Cl. ............... 436/55; 436/50; 436/163; 422/62; 422/108; 422/111; 210/743; 55/227; 55/228; 95/9; 95/187
[58] Field of Search ............... 436/55, 50, 163; 422/62, 108, 111; 210/743; 55/227, 228; 95/9, 187

[56] References Cited

U.S. PATENT DOCUMENTS

| | | | |
|---|---|---|---|
| 4,329,649 | 5/1982 | Scoates | 324/438 |
| 4,762,796 | 8/1988 | Weber et al. | 436/55 |
| 4,940,551 | 7/1990 | Riggs et al. | 210/743 |
| 4,945,939 | 8/1990 | Maxwell et al. | 137/93 |
| 5,246,594 | 9/1993 | Stegemann et al. | 210/743 |

FOREIGN PATENT DOCUMENTS 2215327 9/1989 United Kingdom.

*Primary Examiner*—Jill Warden
*Assistant Examiner*—Sharidan Carrillo
*Attorney, Agent, or Firm*—Michael J. Striker

[57] ABSTRACT

The method of continuously controlling pH of an acid scrubbing liquid includes continuously withdrawing a constant partial stream from the scrubbing liquid; continuously measuring a pH in the partial stream with a glass electrode; adding base at a first rate to the partial stream upstream of the glass electrode and continuing the adding until the measured pH is in a pH set-point range of from 2.5 to 11.5; after the pH is in the pH set-point range, changing the first rate of adding base to the constant partial stream to compensate any subsequently occurring pH deviations; during the changing of the first rate of base addition, measuring the first rate of base addition to obtain a measured first rate; and automatically controlling a pH of the acid scrubbing liquid using the measured first rate as a controlling parameter by selecting a rate set-point range of the first rate of adding base to the constant partial stream so that the measured pH can be brought into the pH set-point range of from 2.5 to 11.5 and adding base at a second rate to the acid scrubbing liquid from which the partial steam is withdrawn to compensate for any subsequent fluctuations of the measured first rate from the rate set-point range.

4 Claims, 2 Drawing Sheets

PROCESS OF CONTINUOUSLY CONTROLLING THE PH OF AN ACID LIQUID INCLUDING MEASURING THE PH CONTINUOUSLY WITH A GLASS ELECTRODE

BACKGROUND OF THE INVENTION

This invention relates to a process of continuously measuring and controlling the pH of an acid liquid, wherein the pH is continuously measured with a glass electrode.

Processes of continuously measuring and controlling the pH with use of glass electrodes are known. In those cases a dual two-phase system comprising glass as a common phase is described as a glass electrode. The voltages which depend on the ion activities are generated on the interfaces of the glass phase, which may also be described as a glass membrane, differently from the usage in electrochemistry. The action of the glass electrode is due to the fact that certain glasses assume with respect to aqueous solutions a potential which depends on the activity of the hydrogen ions in the solution. It is presently believed that that interfacial potential is due to an ion exchange process between the alkali ions of the glass and the protons of the solution in the gel layer developing on the glass membrane. The glass electrode can be used to determine the pH of solutions having a pH between 2 and 12. Outside that range the indicated potential is no longer directly proportional to the hydrogen ion concentration of the solution because errors of the readings in the acid or alkaline regions may occur. Such errors are caused by the chemical composition of the electrode glass. An error of the reading in the acid region will simulate a higher pH and an error of the reading in the alkali region will simulate a lower pH. For this reason the measurement and control of the pH of an acid liquid having a fluctuating pH will not be without problems, particularly if the fluctuating pH of an acid liquid may drop below 2, because this may result not only in an error in the acid region but also in a destruction of the glass electrode.

Published German Application 41 17 382 discloses a process of controlling the pH of an acid scrubbing liquid, which is used at a pH<3 in a scrubbing zone. Acid constituents are removed from flue gas in the scrubbing zone and the scrubbing liquid is circulated at least in part. A partial stream of the scrubbing liquid is continuously mixed with a stream of an alkaline solution having a constant concentration and a constant volume rate and the pH of the mixture is continuously measured with a glass electrode. When the pH of the scrubbing liquid drops below 5, a neutral or alkaline correcting liquid is added to the scrubbing liquid until the pH exceeds 5. But that process has the disadvantage that even relatively small fluctuations of the relatively low pH of the scrubbing liquid will cause the pH at the electrode to change to a value above or below the range from 2 to 12 so that the pH cannot accurately be measured with a glass electrode.

SUMMARY OF THE INVENTION

It is an object of the invention to provide for the continuous measurement and control of the pH of an acid liquid a process in which the pH is continuously measured with a glass electrode and which can reliably be carried out even if the pH of the acid liquid fluctuates in a range of relatively low values.

This object underlying the invention is attained in part when the acid liquid is supplied at a constant rate to contact the glass electrode, base is added at a rate to the acid liquid before it contacts the glass electrode until the pH at the glass electrode is in a pH set point range from 2.5 to 11.5, and any subsequently occurring deviation of the pH at the glass electrode from the pH setpoint range is compensated by a change of the base supply rate. In the process in accordance with the invention the pH of the acid liquid is directly determined from the rage at which the base is required. For a mixture of a strong acid and a strong base, the ionic product of the water is used in the following equations, which can be derived from each other and can be used for technical calculations:

$$C_H \times C_{OH} = 10^{-14} \tag{1}$$

$$\log C_H + \log C_{OH} = -14 \tag{2}$$

$$-\log C_H = \log C_{OH} + 14 \tag{3}$$

$$pH = \log C_{OH} + 14 \tag{4}$$

$$C_{OH} = 10^{pH-14} \tag{5}$$

It has surprisingly been found that the process in accordance with the invention can be carried out even in case of relatively large fluctuations of the pH of the acid liquid and it is possible to use a glass electrode to measure the pH. By the process in accordance with the invention the pH at the glass electrode can constantly be maintained in the range from 2.5 to 11.5 so that errors of the readings in the acid or alkaline region or even a destruction of the glass electrode can be avoided.

According to a preferred feature of the invention a pH setpoint range from 10.5 to 11.5 is adjusted. With that measure the process of continuously measuring and controlling the pH of an acid liquid, wherein the pH is continuously measured with a glass electrode, can be carried out particularly reliably and safely.

According to a further preferred feature of the invention an NaOH solution is used as a base. If an NaOH solution is used as a base, the pH of an acid liquid can be automatically controlled with a relatively short time lag.

According to a further preferred embodiment of the invention the acid liquids which are used consist of scrubbing liquids, which have been formed by the wet separation of $SO_2$ or $SO_3$ or $HCl$ or $HF$ or mixtures thereof from flue gases. In case of changes of the composition of the flue gas such scrubbing liquids have, as a rule, a comparatively widely fluctuating, low pH so that the process in accordance with the invention can be used to special advantage for a continuous measurement and control of the pH.

According to a further preferred feature of the invention the pH of the entire scrubbing liquid is continuously measured and controlled in that the pH of a constant partial stream of the scrubbing liquid is continuously measured with a glass electrode and base at a first rate is added to the partial stream before it contacts the glass electrode until the pH at the glass electrode is in a pH setpoint range from 2.5 to 11.5 and any subsequently occurring deviations of the pH at the glass electrode from the pH set point range is compensated by a change of the first rate at which base is added to the partial stream of the scrubbing liquid, the first rate at which base is added to the partial stream of the scrubbing liquid is continuously measured and used as a controlled variable for an automatic control of the pH of the entire scrubbing liquid, the setpoint range of the first rate at which base is added to the partial stream of the scrubbing liquid is so selected that the pH at the glass electrode is maintained within a pH setpoint range from 2.5 to 11.5, and any subsequent deviations of the first rate at which base is added to the partial stream of the scrubbing liquid from its setpoint range is compensated by a change of a second rate at which base is added to the entire scrubbing liquid. It is desirable that the pH of the scrubbing liquid can be continuously measured and controlled with a relatively small time lag and reliably and that a glass electrode is used to determine the pH. In that case the fluctuation of the first rate at which the base is added to the partial stream of the scrubbing liquid is used as a direct measure of the second rate at which base is added to the entire scrubbing liquid.

The subject matter of the invention will subsequently be explained more in detail with reference to the drawings (FIGS. 1, 2).

DESCRIPTION OF THE PREFERRED EMBODIMENT

Figure 1:
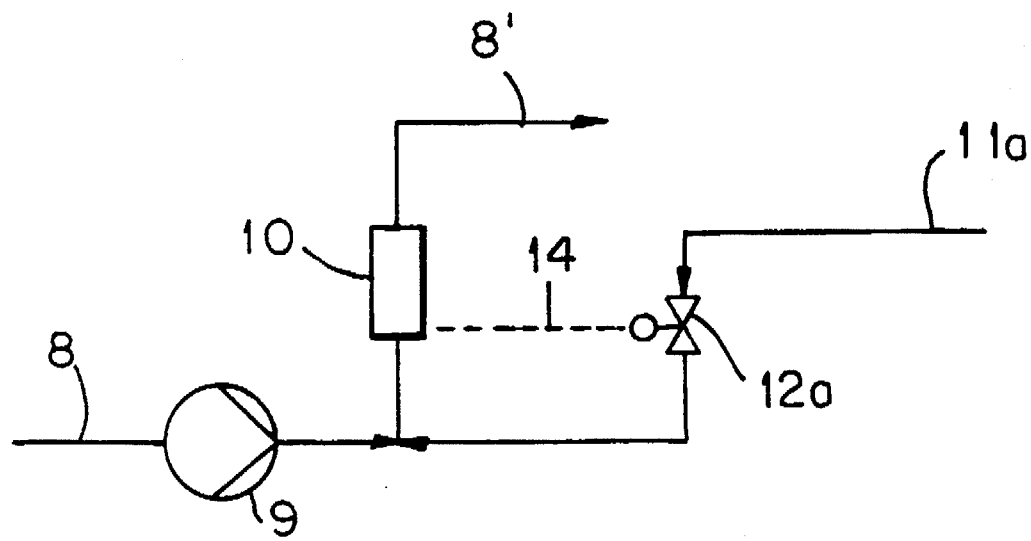
FIG. 1 is a flow chart showing a part of one embodiment of the process of continuously measuring and controlling the pH of an acid liquid by means of a sensor.

FIG. 1 is a flow scheme illustrating the process in accordance with the invention for the continuous measurement and control of the pH of an acid liquid. Acid liquid at a constant rate is supplied through the line 8 and the liquid pump 9 to the sensor 10. The pH sensor 10 comprises a glass electrode (not shown) for the continuous measurement of the pH. Before the acid liquid reaches the sensor 10, base supplied through line 11a and the valve 12a is added at a rate to the acid liquid. The mixture of acid liquid and base is discharged from the system through the line 8'. The rate at which the base is supplied through line 11a is so selected that the pH at the glass electrode of the pH sensor is within a setpoint range from 2.5 to 11.5, preferably from 10.5 to 11.6. For instance, if the pH of the acid scrubbing liquid decreases below the lower limit of 2.5, the valve 12a will be opened further to increase the rate at which base is supplied through the line 11a. A corresponding information is delivered from the sensor 10 via a controller (not shown) and a signal line 14 to the valve 12a. In that case a destruction of the glass electrode will be avoided because base is added to the acid liquid before the pH at the glass electrode drops below 2.

Figure 2:
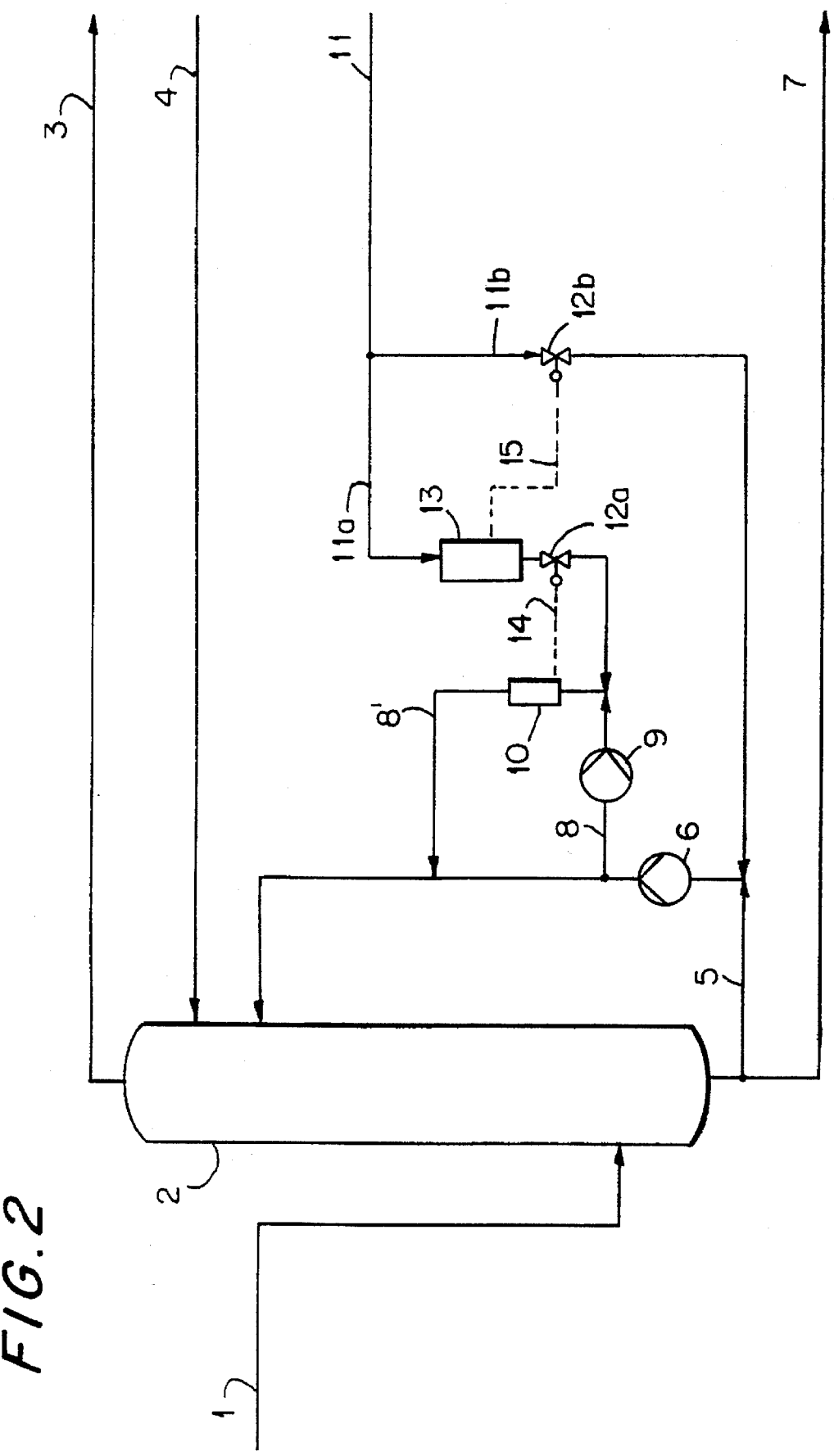
FIG. 2 is a flow chart showing an embodiment of the process for continuously measuring and controlling pH of an acid scrubbing liquid from a scrubber.

FIG. 2 is a flow scheme illustrating also the scrubber 2 and the pH-sensor 10. The raw gas which contains $SO_2$ or $SO_3$ or HCl or HF or mixtures thereof flows through the line 1 to the scrubber 2 and is contacted therein with scrubbing liquid, which is supplied to the scrubber 2 through the line 4. In the scrubber 2 the acid pollutants are removed from the raw gas, which is discharged from the scrubber 2 through line 3. The scrubbing liquid laden with the acid pollutants is circulated through the line 5 and the liquid pump 6. A constant partial stream of the scrubbing liquid flows through line 8 and liquid pump 9 to the pH sensor 10. Base which is supplied through the line 11a to the partial stream of the scrubbing liquid is added to that partial stream at a first rate of addition. The first rate of the base is continuously measured with a flow rate sensor 13. The pH sensor 10 comprises a glass electrode (not shown) for a continuous measurement and control of the pH. The partial stream of the scrubbing liquid is supplied through line 11a with base at such a first rate that the pH at the glass electrode is within a setpoint range from 2.5 to 11.5, preferably from 10.5 to 11.5. An increase of the concentration of $SO_2$ or $SO_3$ or HCl or HF or mixtures thereof in the raw gas will result in a decrease of the pH of the entire scrubbing liquid and also in a decrease of the pH of that partial stream of the scrubbing liquid which is supplied through line 8 and liquid pump 9 to the pH sensor 10. If the pH at the glass electrode drops below the pH setpoint range from 2.5 to 11.5, the first rate of addition of base must be increased. In that case information of that condition is delivered directly from the pH-sensor 10 through a controller (not shown) and a signal line 14 to the valve 12a. The valve 12a is then opened further so that base is supplied at a higher first rate to the partial stream of the scrubbing liquid. The change of the first rate of base is detected by the flow rate meter 13. The setpoint range for the first rate at which base is supplied to the partial stream of the scrubbing liquid is so selected that the adjusted pH setpoint range for the pH at the glass electrode is from 2.5 to 11.5, preferably from 10.5 to 11.5. In response to a drop of the pH value at the glass electrode below 2.5, the first rate at which base is to be supplied to the partial stream of the scrubbing liquid will be increased above the setpoint range for that first rate because base at a relatively high first rate must then be supplied through line 11a to the partial stream of the scrubbing liquid. This means also that the pH of the entire scrubbing liquid is too low and base must be supplied to the entire scrubbing liquid at such a high second rate that the pH at the glass electrode is again within the pH setpoint range. For this reason the flow rate meter 13 is directly connected via a controller (not shown) and a signal line 15 to the valve 12b. If the first rate at which the base is supplied to the partial stream of the scrubbing liquid is increased above its setpoint range, the valve 12b will be opened and base at a second rate will be supplied through line 11b to the entire scrubbing liquid conducted in line 5. The line 11a for addition of base at the first rate and the line 11b for addition of base at the second rate are connected to a common supply line 11. The mixture of base added at the first rate and the partial stream of the scrubbing liquid is supplied behind or downstream of the pH sensor 10 through line 8' to the scrubbing liquid, which is circulated.

For a regeneration of the scrubbing liquid which is laden with the acid pollutants it is necessary from time to time that a part of the scrubbing liquid is withdrawn through line 7 and is separately processed.

The invention will be described more in detail hereinafter with reference to examples:

EXAMPLE 1

To adjust the pH at a glass electrode to a value within a pH setpoint range from 2.5 to 11.5, sodium hydroxide solution at a rate of 0.252 moles per liter is continuously added to a strong acid, the pH of which should be measured and should optionally be controlled. In that case a pH of 11 is obtained at the glass electrode. The concentration of the $OH^-$ ions which were required to adjust the pH from 7 to 11 is determined in accordance with equation 4:

$$pH = \log C_{OH^-} + 14$$

as $\quad \log C_{OH^-} = pH - 14 = 11 - 14 = -3$ so that $\quad C_{OH^-} = 0.001$ mole per liter This means that 0.251 mole per liter sodium hydroxide solution or 0.251 mole per liter $OH^-$ ions were required for a complete neutralization of the strong acid. For this reason the concentration of the $H_3O^+$ ions of the strong acid and its pH are determined as $C_{H_3O^+} = 0.251$ mole per liter = $10^{-0.6}$ mole per liter.

This means that the strong acid is at pH 0.6. Because that value has not been changed during the continuous measurement of the pH, it is not necessary to change the rate at which sodium hydroxide solution is to be supplied in order to compensate any deviation of the pH at the glass electrode from the pH setpoint range. In that example the process in accordance with the invention permits a measurement of a pH=0.6 by means of a glass electrode, which is not destroyed during the measurement although the pH of the strong acid which is to be measured is relatively far below 2.

EXAMPLE 2

The pH of a strong acid fluctuates about 0.6 and is to be continuously measured and controlled with a glass electrode. The pH setpoint of the strong acid is 0.6. To protect the glass electrode, the pH at the glass electrode is to be adjusted to a value within a pH setpoint range from 5 to 9.

I. Solution proposed by the prior art apparent from Published German Application 41 17 382 (control example)

In a strong acid at a pH 0.6:

$C_{H_3O^+} = 10^{-0.6}$ mole per liter = 0.251 mole per liter pH 7 is selected as a setpoint for the pH at the glass electrode. For this reason 0.251 mole per liter of a strong base is required for a complete neutralization to pH 7. As in Example 1, sodium hydroxide solution is used as a strong base also in the example.

For this reason sodium hydroxide solution at a range of 0.251 mole per liter is supplied to the strong acid. Contrary to the process in accordance with the invention that rate of sodium hydroxide solution is constantly maintained regardless of fluctuations of the pH of the strong acid.

During the continuous measurement the pH of the strong acid rises from 0.6 to 0.7. As a result, OH⁻ ions are to be supplied at a rate of $C_{OH^-} = 10^{-0.7}$ mole per liter = 0.2 mole per liter.

For this reason sodium hydroxide solution at a rated 0.2 mole per liter is required for a complete neutralization. But in the process proposed by Published German Application 41 17 382 the concentration of the sodium hydroxide solution which is supplied is maintained constant. For this reason sodium hydroxide solution at a rate of 0.251 mole per liter −0.2 mole per liter=0.051 mole per liter is available to further increase the pH at the glass electrode. As a result, the pH at the glass electrode is, in accordance with equation 4:

$$\text{pH} = \log C_{OH^-} + 14$$
$$= \log 0.051 + 14 = \underline{12.7}.$$

After 20 minutes the pH of the strong acid drops from 0.7 to 0.5. Sodium hydroxide solution at a rate of $10^{-0.5}$ mole per liter=0.316 mole per liter is required for a complete neutralization of a solution at pH 0.5. But only 0.251 mole per liter sodium hydroxide solution is available to that acid is present in an excess of 0.065 mole per liter. As a result, the pH at the glass electrode drops from 12.7 to 1.2 because the concentration of $H_3O^+$ ions is:

$C_{H_3O^+} = 0.065$ mole per liter = $10^{-1.2}$ mole per liter.

It is apparent that the process proposed in Published German Application 41 17 382 can no longer be adopted when the pH of a strong acid fluctuates only by ±0.1 from 0.6 because even in that case the pH at the glass electrode will fluctuate in the range from 1.2 to 12.7 and the pH at the glass electrode can no longer be maintained in the pH setpoint range from 5 to 9.

II. Solution according to the process in accordance with the invention

In the process in accordance with the invention it is contemplated that any deviation of the pH at the glass electrode from the pH setpoint range will be compensated by a change of the rate at which base is supplied. If the strong acid is at pH 0.6, sodium hydroxide solution at a rate of 0.251 mole per liter is added to the strong acid before it contacts the glass electrode so that the pH at the glass electrode is 7. If the pH of the strong acid rises to 0.7, sodium hydroxide solution will be supplied to the strong acid at a rate of only 0.2 moles per liter rather than of 0.251 moles per liter so that the pH at the glass electrode can again be adjusted to 7 without a deviation from the pH setpoint range from 5 to 9. If the pH of the strong acid subsequently drops to 0.5, sodium hydroxide solution at a range of 0.316 mole per liter will be required for a complete neutralization. For this reason, if the pH of the strong acid drops to 0.5, sodium hydroxide solution at a rate of 0.316 mole per liter will be supplied to the strong acid in the process in accordance with the invention so that the pH at the glass electrode can again be adjusted to 7.

In conclusion, the solution proposed for the process in accordance with the invention has the following results:

| pH of acid liquid | Sodium hydroxide solution supply rate, mole per liter |
| --- | --- |
| 0.5 | 0.316 |
| 0.6 | 0.251 |
| 0.7 | 0.200 |

It is apparent that a functional relationship exists between the pH of the acid liquid and the concentration of the sodium hydroxide solution to be supplied. For this reason the concentration at which the sodium hydroxide solution is to be supplied can be regarded as a direct measure of the pH of the acid liquid. This will also be true if the pH of weak acids or of mixtures of strong and weak acids is to be measured and controlled. The influence of volume changes has no technological significance and can be neglected in the calculation in general.

EXAMPLE 3

Flue gas at a rate of 100,000 m³/h is supplied to a scrubber and is contacted with counterflowing scrubbing liquid at a rate of 290 m³/h. The flue gas contains 400 mg/m³ $SO_2$, 3 mg/m³ $SO_3$, 1000 mg/m³ HCl, and 10 mg/m³ HF. The scrubbing liquid is sprayed in the upper portion of the scrubber and withdrawn from the lower portion of the scrubber and is subsequently re-contacted with the flue gas in the upper portion of the scrubber. Scrubbing liquid at a rate of 100 liters per hour is taken from that circulating scrubbing liquid and is supplied to a pH sensor. The pH is measured with a glass electrode. As in Examples 1 and 2, sodium hydroxide solution is used as a base.

Sodium hydroxide solution at a rate of 4.7 liters per hour is supplied to the partial stream of the scrubbing liquid before that partial stream is contacted with the glass electrode of the pH sensor. As a result, the pH at the glass electrode is 11.0, which is within the selected pH setpoint range from 10.5 to 11.5. For neutralizing the pollutants HCl and HF which have been scrubbed out, sodium hydroxide solution at a second rate of 0.51 m$^3$/h is supplied to the circulating scrubbing liquid. After 30 minutes, the pH at the glass electrode has dropped below the pH setpoint range and, as a result, the first rate at which base is to be supplied to the partial stream of the scrubbing liquid is increased to 5.3 liters per hour. The first flow rate of the sodium hydroxide solution supplied to the partial stream of the scrubbing liquid is continuously measured with a flow rate meter. Because the flow rate at which the sodium hydroxide solution is supplied to the partial stream of the scrubbing liquid has been increased from 4.7 to 5.3 liters per hour, sodium hydroxide solution at a second rate of 2.25 m$^3$/h is supplied to the entire circulating scrubbing liquid, which is to be maintained at pH=0.6, and the pH of the circulating scrubbing liquid is thus adjusted to 0.6, which corresponds to the desired setpoint. The pure gas is withdrawn from upper portion of the scrubber and contains only 20 mg/m$^3$ HCl and 2 mg/m$^3$ HF. Scrubbing liquid at a rate of about 4 m$^3$/h is continuously withdrawn from the entire circulated scrubbing liquid and is supplied to a separate processing stage. Any deficiency of scrubbing liquid is compensated by fresh water.

We claim:

1. A method of continuously controlling pH of an acid scrubbing liquid, wherein said acid scrubbing liquid is formed by wet separation of at least one member selected from the group consisting of SO$_2$, SO$_3$, HCl, HF and mixtures thereof from a flue gas, said method comprising the steps of:
   a) continuously withdrawing a constant partial stream from said acid scrubbing liquid;
   b) continuously measuring a pH in said constant partial stream with a glass electrode;
   c) adding base at a first rate to said constant partial stream at a point in said constant partial stream upstream of said glass electrode and continuing the adding of the base until the pH measured in step b) is in a pH set-point range of from 2.5 to 11.5;
   d) after the pH measured in step b) is in the pH set-point range of step c), controlling said pH measured in step b) to compensate any subsequently occurring deviations of the pH measured in step b) by changing said first rate of said adding of said base to said constant partial stream;
   e) during the controlling of said pH in step d), measuring said first rate of said adding of said base to said constant partial stream to obtain a measured first rate; and
   f) automatically controlling a pH of said acid scrubbing liquid using said measured first rate obtained in step e) as a controlling parameter by selecting a rate set-point range of said first rate of adding said base to said constant partial stream so that said pH of said glass electrode measured in step b) can be brought into said pH set-point range of from 2.5 to 11.5 by said controlling of step d) and adding base at a second rate to said acid scrubbing liquid from which said continuously withdrawing of step a) occurs to compensate for any subsequent fluctuations of said measured first rate from said rate set-point range of said first rate.

2. The method as defined in claim 1, wherein said pH set-point range is from 10.5 to 11.5.

3. The method as defined in claim 1, wherein said base is a sodium hydroxide solution.

4. A method of continuously controlling pH of an acid scrubbing liquid, wherein said acid scrubbing liquid is formed by wet separation of at least one member selected from the group consisting of SO$_2$, SO$_3$, HCl, HF and mixtures thereof from a flue gas, said method comprising the steps of:
   a) continuously withdrawing a constant partial stream from said acid scrubbing liquid;
   b) continuously measuring a pH in said constant partial stream with a glass electrode;
   c) adding base at a first rate to said constant partial stream at a point in said constant partial stream upstream of said glass electrode;
   d) changing the first rate of the adding of the base in step c) to compensate any subsequently occurring deviations of the pH measured in step b) from a pH set-point range of 2.5 to 11.5;
   e) measuring said first rate of said adding of said base to said constant partial stream to obtain a measured first rate; and
   f) adding base at a second rate to said acid scrubbing liquid from which said continuously withdrawing of step a) occurs to compensate for any subsequent deviations of said measured first rate from a predetermined rate set-point range of said first rate to maintain said pH within said pH set-point range regardless of the magnitude and the speed of said deviations of said measured pH from said pH set-point range.

* * * * *